(12) United States Patent
Slater et al.

(10) Patent No.: US 8,660,994 B2
(45) Date of Patent: Feb. 25, 2014

(54) SELECTIVE DATA DEDUPLICATION

(75) Inventors: Alastair Slater, Chepstow Monmouthshire (GB); Simon Pelly, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 420 days.

(21) Appl. No.: 12/695,285

(22) Filed: Jan. 28, 2010

(65) Prior Publication Data

US 2011/0184908 A1  Jul. 28, 2011

(51) Int. Cl.
*G06F 7/00* (2006.01)
*G06F 17/30* (2006.01)

(52) U.S. Cl.
USPC .......................................... 707/664; 707/692

(58) Field of Classification Search
USPC .......................................... 707/662, 664, 692
See application file for complete search history.

(56) References Cited

U.S. PATENT DOCUMENTS

| | | | |
|---|---|---|---|
| 5,638,509 A | 6/1997 | Dunphy |
| 5,990,810 A | 11/1999 | Williams |
| 6,141,053 A | 10/2000 | Saukkonen |
| 6,513,050 B1 | 1/2003 | Williams |
| 6,839,680 B1 | 1/2005 | Liu |
| 6,938,005 B2 | 8/2005 | Iverson |
| 6,961,009 B2 | 11/2005 | McCanne |
| 7,082,548 B2 | 7/2006 | Nakano |
| 7,085,883 B1 | 8/2006 | Dalgic |
| 7,269,689 B2 | 9/2007 | Eshghi |
| 7,536,291 B1 | 5/2009 | Vijayan Retnamma |
| 7,558,801 B2 | 7/2009 | Getzinger |
| 2001/0010070 A1 | 7/2001 | Crockett |
| 2002/0103975 A1 | 8/2002 | Dawkins |
| 2002/0156912 A1 | 10/2002 | Hurst |
| 2003/0101449 A1 | 5/2003 | Bentolila |
| 2003/0110263 A1 | 6/2003 | Shillo |
| 2003/0140051 A1 | 7/2003 | Fujiwara |
| 2003/0223638 A1 | 12/2003 | Jackson |
| 2004/0054700 A1 | 3/2004 | Okada |
| 2004/0162953 A1 | 8/2004 | Yoshida |
| 2005/0091234 A1 | 4/2005 | Hsu |
| 2006/0059173 A1 | 3/2006 | Hirsch |
| 2006/0059207 A1 | 3/2006 | Hirsch |
| 2006/0155735 A1 | 7/2006 | Traut |
| 2006/0293859 A1 | 12/2006 | Pipke |
| 2007/0220197 A1 | 9/2007 | Lasser |
| 2007/0250519 A1 | 10/2007 | Fineberg |

(Continued)

FOREIGN PATENT DOCUMENTS

| | | |
|---|---|---|
| WO | 2006030326 A1 | 3/2006 |
| WO | 2006094365 A1 | 9/2006 |

(Continued)

OTHER PUBLICATIONS

Fenstermacher et al.; "Mining Client-Side Activity for Personalization" Department of Management Information Systems, Eller College of Business and Public Administration, University of Arizona, Jun. 2002 (8 pages).

(Continued)

*Primary Examiner* — Vincent F Boccio

(57) ABSTRACT

Data is selectively deduplicated such that portions of data suitable for deduplication are passed to a deduplication engine (1064) and stored in a first store (1072).

12 Claims, 3 Drawing Sheets

(56) References Cited

U.S. PATENT DOCUMENTS

| | | | |
|---|---|---|---|
| 2007/0250670 | A1 | 10/2007 | Fineberg |
| 2008/0098454 | A1* | 4/2008 | Toh .................................... 726/1 |
| 2008/0126176 | A1 | 5/2008 | Iguchi |
| 2009/0112945 | A1 | 4/2009 | Camble |
| 2009/0112946 | A1 | 4/2009 | Jones |
| 2009/0113167 | A1 | 4/2009 | Camble |
| 2009/0228599 | A1* | 9/2009 | Anglin et al. ................. 709/231 |
| 2009/0307285 | A1* | 12/2009 | Gipp et al. .................... 707/204 |
| 2010/0179930 | A1* | 7/2010 | Teller et al. ..................... 706/12 |
| 2010/0198730 | A1* | 8/2010 | Ahmed et al. .................. 705/50 |
| 2010/0198792 | A1 | 8/2010 | Camble |
| 2010/0198797 | A1* | 8/2010 | Wideman ..................... 707/692 |
| 2010/0198832 | A1 | 8/2010 | Jones |
| 2010/0205163 | A1 | 8/2010 | Eshghi |
| 2010/0235372 | A1 | 9/2010 | Camble |
| 2010/0235485 | A1 | 9/2010 | Lillibridge |
| 2010/0246709 | A1 | 9/2010 | Lillibridge |
| 2010/0280997 | A1 | 11/2010 | Lillibridge |
| 2011/0184909 | A1 | 7/2011 | Slater |

FOREIGN PATENT DOCUMENTS

| | | |
|---|---|---|
| WO | 2006094366 A1 | 9/2006 |
| WO | 2006094367 A1 | 9/2006 |
| WO | 2007127248 A2 | 11/2007 |
| WO | 2009054828 A1 | 4/2009 |
| WO | 2009131585 A1 | 10/2009 |

OTHER PUBLICATIONS

Baoyao, Zhou; "Intelligent Web Usage Mining" Nanyang Technological University, Division of Information Systems, School of Computer Engineering, 2004 (94 pages).

Hottolink Inc.; "Recognize" Online, http://www.hottolink.co.jp/english/reconize.html, 2009 (2 pages).

Andrejko et al.: User Characteristics Acquisition from Logs with Semantics, Slovak University of Technology in Bratislava, 2007 (8 pages).

Hongjun Lu et al: Extending a Web Browser with Client-Side Mining, Hong Kong University of Science and Technology Department of Computer Science, Clear Water Bay, Kowloon, Hong Kong, China, 2003 (12 pages).

Shankar et al.; "Personalized Web Search Based on Client Side Ontology", CS 498: B.Tech Project,10. IIT Kanpur, India 2010 (9 pages).

Sendhikumar et al.; "Personalized ontology for web search personalization" Anna University, Chennai, India , 2008 (7 pages).

Shahabi et al.; "Yoda an Accurate and Scalable Web based Recommendation System?" University of SouthernCalifornia, Los Angeles, Sep. 2001 (14 pages).

Why Wubat? Website User Behavior & Analysis Tool, Wubat, Online, http://www.wubat.com/ dated on or before Oct. 12, 2010 (3 pages).

Claypool et al.; "Implicit Interest Indicators", Worcester Polytechnic Institute, Worcester, Computer Science Department Worcester Polytechnic Institute Worcester, MA 01609, USA., 2001 (8 pages).

Shahabi et al.; A Framework for Efficient and Anonymous Web Usage Mining Based on Client-Side Tracking, University of Southern California, Los Angeles, 2002 (48 pages).

Anthony Ha: Facebook investor backs Chattertrap, a personal assistant for content, Jun. 28, 2010 (6 pages).

Muthitacharoen Athicha, et al., "A Low-Bandwidth Network File System," Proceedings of the 18th ACM Symposium on Operating Systems Principles (SOSP '01), Oct. 2001 (14 pages).

L. L. You and C. Karamanolis. Evaluation of Efficient Archival Storage Techniques. In Proceedings of the 21st IEEE / 12th NASA Goddard Conference on Mass Storage Systems and Technologies, pp. 227-232, College Park, Maryland, Apr. 2004.

You L. L. et al., "Deep Store an Archival Storage System Architecture" Data Engineering, 2005. ICDE 2005. Proceedings. 21st. intl Conf on Tokyo, Japan, Apr. 5-8, 2005, pp. 12.

Eshghi et al., "Jumbo Store: Providing Efficient Incremental Upload and Versioning for a Utility Rendering Service," 2007 (16 pages).

Brin, Sergey, et al., "Copy Detection Mechanisms for Digital Documents", Department of Computer Science, Stanford University, Oct. 31, 1994, p. 1-12.

Manber, Udi, "Finding Similar Files in a Large File System," Department of Computer Science, University of Arizona, TR 93-33, Oct. 1993, (11 pages).

Rabin, M.O., "Fingerprinting by Random Polynomials," Technical Report, Center for Research in Computing Technology, Harvard University, 1981, Report TR-15-81 (14 pages).

* cited by examiner

```
filetype {
  magic { 0x12 0x34 0x56 0x78 } dontdedupe    [if condition]
  magic { 0x22 0x33 } dedupe                  [if condition]
  extension .mp3 dontdedupe                   [if condition]
} streamtype application ( 0x12 0x34 0x56 0x78 )
{ headertype {
    starts   { 0x12 0x34 0x56 0x78 }
    ends     { <bytes..> }   # or for VTL, ends "at N filemarks", where N >=1
    length   n KB/MB
  } recordtypes {
    recordtype 64kb {
      length 65536                         # bytes
      { dedupe all                         # or dedupe <range>, where range is 0..65536 bytes here.
        dedupe all     if <condition>      # dedupe matching records if condition is met
        dedupe <range> if <condition>      # dedupe range if condition is met
      }
    } recordtype bad64KB {
      length 65536
      starts [ 0xii 0xjj 0xkk 0xll ]
      dontdedupe
    } recordtype anythingelse {
      # length unset
      dedupe
    }

} catalogueformat {
    starts { 0xAA 0xBB 0xCC 0xDD }
    ends   { 0xEE 0xEE 0xEE 0xEE }
  } stream {
    header
    records
    [ filemark ]                # can specify filemarks within stream if desired for VTL
    catalogue  every 2 MB/GB    dontdedupe
    records
  }
} conditions -> if localtime within HH:MM to HH:MM
    if compressible             # run this block/range through (eg) LZW/similar
                                # and if >1:1 then condition met
    if freecapacity > N MB/GB   # if free space on appliance meets capacity defined
    if loadavg < N              # met if load average on appliance low enough,
                                # - hence first in gets dedupe, as load grows, less dedupe if itemsize <>/== <size>    # if itemsize < / > / == to quantity in MB/GB
```

Figure 2

SELECTIVE DATA DEDUPLICATION

BACKGROUND

In storage technology, use of mass data storage facilities to provide data storage as a backup to mitigate the impact of data loss is well known. In order to improve storage capacity, many different deduplication techniques have been developed in which duplicated data is removed and a pointer to previously stored data is stored in its place. One deduplication technique includes inline dedupe processing in which data is passed to a dedupe process which compares data items or blocks of data (such as files or parts of files) with existing stored data to remove duplications of data before it is passed to the backup storage. Another technique includes post dedupe processing in which data items are first stored and then deduplicated after the backup is complete.

BRIEF DESCRIPTION OF DRAWINGS

For a more complete understanding of the present invention, reference is now made to the following description taken in conjunction with the accompanying drawings in which:

FIG. 2 is an example of a definition file for selecting segments for deduplication.

DETAILED DESCRIPTION

Figure 1:
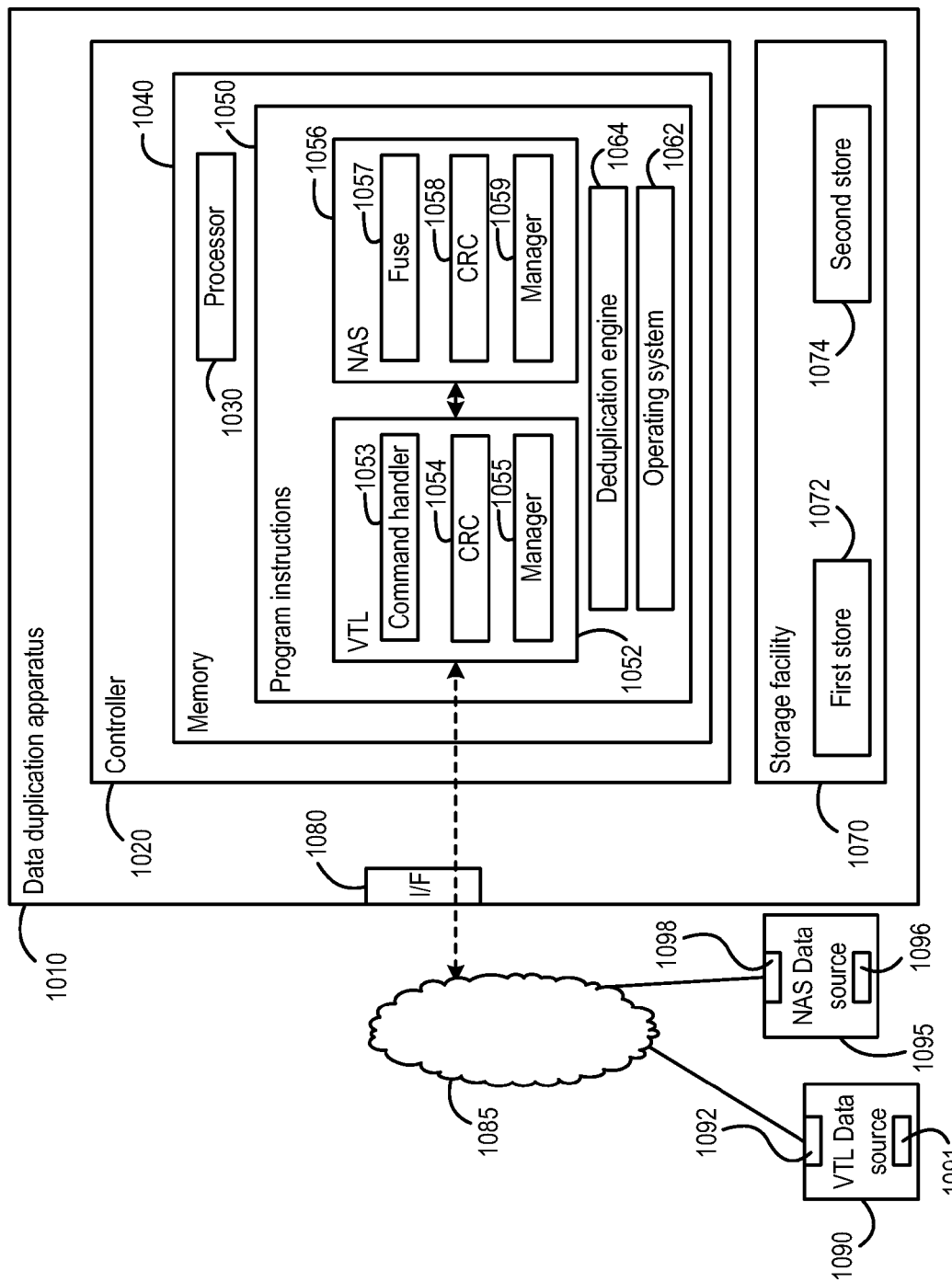
FIG. 1 is a schematic of data deduplication apparatus including selective deduplication.

With reference to FIG. 1, an exemplary data deduplication apparatus 1010 comprises data processing apparatus in the form of a controller 1020 having a processor 1030 and a computer readable medium 1040 in the form of a memory. The memory 1040 can comprise, for example, RAM, such as DRAM, and/or ROM, and/or any other convenient form of fast direct access memory. The deduplication apparatus 1010 further comprises a storage facility 1070 comprising a first store 1072 and a second store 1074. The first store 1072 may provide slower access speeds than the second store 1074. The first store 1072 comprises hard disk drives, or any other convenient form of mass storage. The second store 1074 comprises a memory having random access, for example, for example, typical random access devices such as disks or other presenting a file system level abstraction and allowing random access.

The hardware of the exemplary data deduplication apparatus 1010 can, for example, be based on an industry standard server. The storage facility 1070 can be located in an enclosure together with the data processing apparatus 1010 or separately at a remote location, for example.

During use of the data deduplication apparatus 1010, the memory 1040 has stored thereon computer program instructions 1050 executable on the processor 1030, including an operating system 1062 comprising, for example, a Linux, UNIX or OS-X based operating system, Microsoft Windows operating system, or any other suitable operating system. The data deduplication apparatus 1010 also includes at least one communications interface 1080 for communicating with at least one external data source 1090, 1095, for example over a network 1085. The or each data source 1090, 1095 can comprise a computer system such as a host server or other suitable computer system, executing a storage application program 1091, for example a backup application having a backup data in a VTL file system and a storage application program 1096, for example having backup data in a Network Attached Storage (NAS) file system.

A link can be formed between the communications interface 1080 and host communications interfaces 1092, 1098 over the network 1085, for example comprising a Gigabit Ethernet LAN or any other suitable technology. The communications interface 1080 can comprise, for example, a host bus adapter (HBA) using Internet Small Computer System Interface (iSCSI) over Ethernet or Fibre Channel protocols for handling backup data in a tape data storage format, a Network Interface Card (NIC) using Network File System (NFS) or Common Internet File System (CIFS) network file system protocols for handling backup data in a NAS file system data storage format, or any other convenient type of interface.

The program instructions 1050 also include modules 1052, 1056 that, when executed by the processor 1030, respectively, provide at least two storage collection interfaces, in the form, for example, of a virtual tape library (VTL) interface 1052 and NAS interface 1054. The program instructions 1050 also include a module 1064 that, when executed by the processor 1030, provides a data deduplication engine 1064.

The exemplary virtual tape library (VTL) interface 1052 is operable to emulate at least one physical tape library, storing in a tape data storage format, for example a sequential data storage format. The VTL interface 1052 is also operable to communicate with storage facilities 1070 having existing storage applications of physical tape libraries. The exemplary Network Attached Storage (NAS) interface 1056 is operable to communicate with a data source having a Network File System (NFS) and operable to communicate with the storage facilities 1070 having existing storage applications of physical tape libraries. A Communications path can be established between a storage application 1091 of the VTL data source 1090 and the VTL interface 1052 using the interface 1092 and the network 1085. A communication path can also be established between storage application 1096 having a NAS file system and the NAS interface 1056 using the interface 1098 and the network 1085.

The VTL interface 1052 comprises a command handler 1053 for handling commands within a data stream from a data source 1092, for example commands from a Small Computer System Interface (SCSI) command set. The VTL interface 1052 may further comprises a Cyclic Redundancy Check (CRC) calculator 1054 and a buffer manager 1055 for interfacing with the deduplication engine 1064 and for reconstituting deduped data for the host computer system in response to commands. Although a CRC calculator is shown in FIG. 1, in an alternative apparatus, it may be excluded.

The NAS interface 1056 comprises a File System in User Space (FUSE) layer 1057 as described in more detail in copending U.S. application Ser. No. 12/695,261, U.S. Publication No. 2011/0184909, filed Jan. 28, 2010, incorporated herein by reference in its entirety, a CRC calculator 1054 and a buffer manager 1059 for interfacing with the deduplication engine 1064 and for reconstituting deduped data for the host computer system in response to io requests. Although a CRC calculator is shown in FIG. 1, in an alternative apparatus, it may be excluded.

To backup data, the VTL interface 1052 receives a stream of data which includes data records and commands in a tape data storage format from the VTL data source 1090. The command handler 1053 actions the commands and passes the data records of the data stream to the buffer manager 1055 which interfaces with the deduplication engine 1064. The data records are passed to the deduplication engine 1064. The data records comprise a plurality of data items. A hash algorithm is run and a hash identifier calculated for each data item. The hash identifiers are compared with previously calculated hash identifiers and if a match is found, the data item for that hash identifier is considered a duplicate and can be removed. It is replaced with a pointer to the data item associated with the previously calculated matching hash identifier. It can appreciated that there may be further optimisations performed within the deduplication process that are not described here but would be known to those skilled in the art. The deduplicated data may be stored in a sequential, tape format or other known formats in the first store 1072 of the storage facility 1070.

Some data items do not deduplicate well or can not be deduplicated at all, for example due to their unique nature such as, for example, files that are very well compressed or have had some redundancy removed as part of their format. One known technique used in deduplication and data compression is content awareness. Files are first stored to disk in native form. Rules are then applied to specify which files are to be deduplicated/compressed based on age, location or file type. The type of compression or suitability for deduplication is selected based on the type of data within the stored file. The files are recursively decomposed into their elemental components until the optimal solution is determined. This operates well for data having post processed deduplication. However, it is unsuitable for inline processing, as described above, due to the delay caused by this selection process as well as the storage capacity needed to store entire files before they are deduped.

Figure 3:
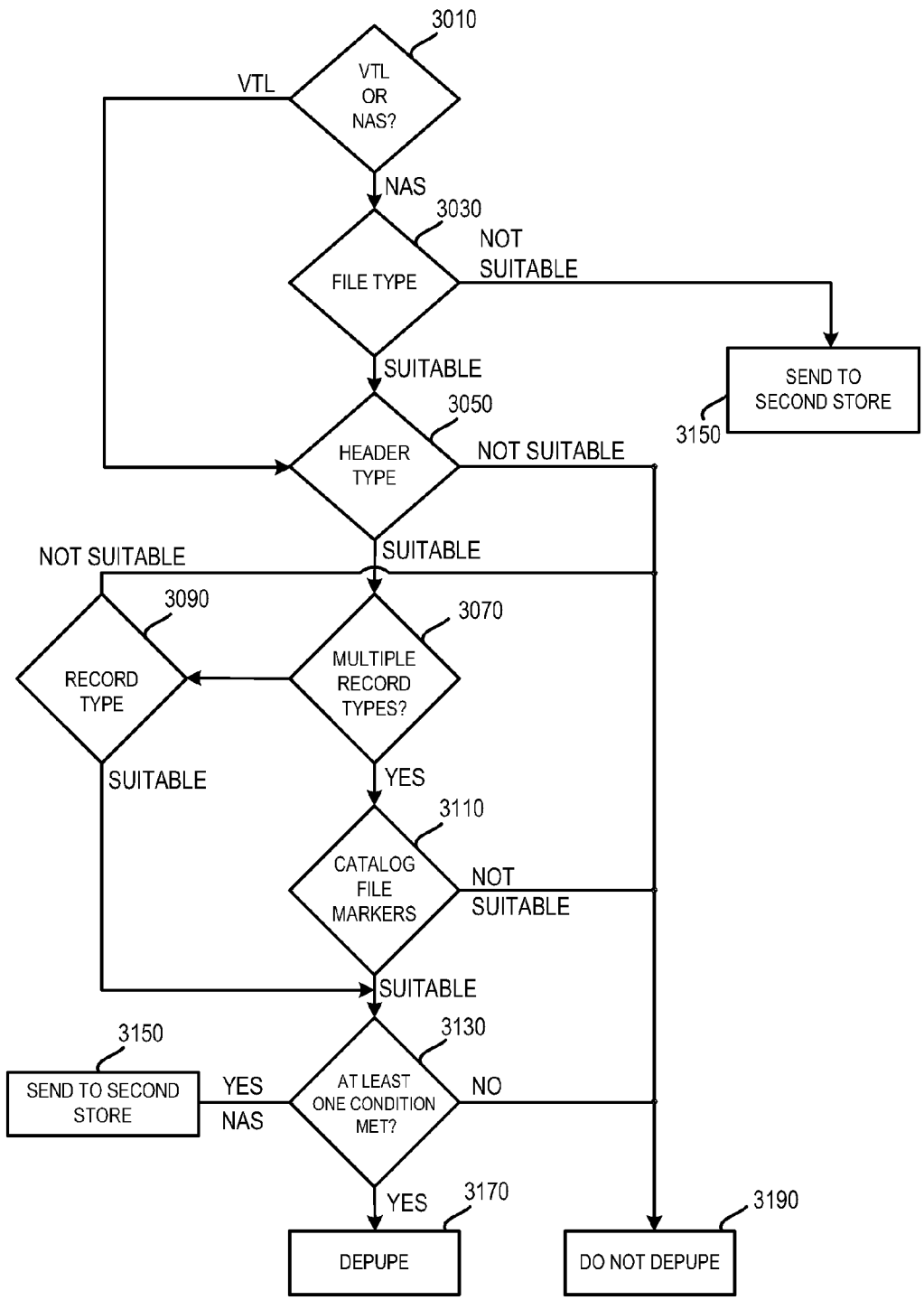
FIG. 3 is a flow chart illustrating the definition file of FIG. 2.

Definition files, shown for example in FIGS. 2 and 3 are loaded into the buffer manager 1055 of the VTL interface 1052 and the buffer manager 1059 of the NAS interface 1056 via web GUI upload (details not provided here). The definition files may be selectively enabled/disabled within the interfaces. The definition file depends on whether the process is in a VTL or NAS file system, step 3010, or alternatively, specific definition files may be loaded up into respective buffer managers 1052, 1059. The incoming data is then marked as being driven by a particular rule definition; and as such the buffer managers 1055, 1059 will try to match the incoming data streams against the predefined parts of the streams provided by the rule definition.

If it is determined to be a NAS source in step 3010, in step 3030, a given filetype is defined, either by magic number (first few bytes), or by filename extension. Filetype definitions are used by the NAS versions of the product. A VTL has no means of identifying files and sees tape 'records', whereas the NAS protocol sees 'files and file requests'. If it is determined to be of a file type not suitable for deduplication in step 3030, i.e. not one of a predetermined type, the file is sent to the second store 1074, step 3150.

If it is determined to be a file type suitable for deduplication, the given stream is then defined in terms of its constituent bytes/entities and decomposed into segments to determine whether to send the segments to dedupe. This is determined by steps 3050 to 3110. This is carried out per streamtype, or multiple stream types per definition may be uploaded.

In step 3050, a headertype, is tagged with either the bytes it starts and ends with, or by the specification of the length, or by the specification of it ending at the next filemark (in the case of a VTL, where filemarks are present—note that a deduping NAS does not have a concept of filemarks as these are alien to the file sharing protocol, but are present on VTL in accordance with the SCSI, SSC specification). If of a predetermined headertype, step 3070 follows, if not the segment or segments are not deduped step 3190.

A number of record types then follow, these define a (possible) given length and the bytes it starts with to be matched, and whether it will go to dedupe, step 3070.

Multiple record type definitions may be present, and length does not have to be set in at least one case—such that there is a default record length to match against, step 3090

Lastly, the whole stream is defined in terms of composition of records, filemarks (if dealing with VTL), step 3110 catalogues and how often they occur if interspersed within the stream. Note that the marker 'records' within the stream definition is to show that any of the possible record types can occur as a multiple at that point in time, the corollary definition of 'record' means that exactly one matching record of any recordtype occurs; and equally if a recordtype of 'anythingelse' it would expect that record type and nothing else.

At least one of the plurality of conditions, step 3130, may then be tested for, for example further testing of obvious conditions, such as the load average on the box (overall processor load), time of day, date, current date within preset parameters, etc.

Upon the first opening and write of a file item in NAS upon the load and subsequent write of a virtual cartridge in VTL into the virtual tape device, the filetypes are checked to see if they should then be sent to dedupe for the remainder of that stream. If not, then data is sent to the second store 1074, step 3150, for the entirety of that backup session. If that check passes (including conditional checks being enforced), then the until such time as a first IO occurs to that stream it is marked as untagged by the buffer manager 1059 of the NAS interface 1056.

Once some data is attempted to be written to a backed up data item (either NAS file, VT cartridge), then an attempt is made to match it against the stream definition—either by matching the first few bytes already written to the start of the data item (if appending to an existing item) or the incoming bytes (if rewriting from extent 0 in the item, i.e effectively writing a new item).

Upon such time as a match occurs—typically by matching the defined bytes tagged beside the stream type definition, then the buffer managers 1055, 1059 process checks every record it sees according to the format defined in the stream type steps 3050 to 3110. If it at any point the process loses track of where it is, it will try and resynchronise on the nearest fixed location boundary—e.g. a fixed length record, in the case where IO sizes match this (obvious for VTL due to tape record length) these are attempted to be matched against. In the case of a NAS file IO, then the stream is decomposed into segments of integral amounts of the defined record sizes.

When a given record is noted as matching, then the condition is tested, step 3130, such as specific environmental data or times of day to further specify whether data should go to dedupe, step 3170, or not step 3190. Once at least one of conditions have been met, step 3130, or not, then a given portion or segment of data can be sent to dedupe, step 3170, or in the case of NAS to the second store, step 3150. Therefore data is sent to the most applicable place.

The segments may comprise at least one chunk of data. To simplify the processing requirements, the chunk may comprise a 64 KB bucket of data that are either in dedupe or resident on disk.

On readback, for example, data is then retrieved from either of the first or second stores 1072, 1074 and reconstituted appropriately (and, thereafter, CRCs calculated by the CRC calculators 1054, 1058 as appropriate before returning data out through the relevant protocol stacks—either SCSI over iSCSI/Fibre Channel (FC) or file requests CIFS/NFS.

As a result determining the type of data before dedupe enable data to be sent to dedupe within a given stream or making it suitable for use for inline dedupe processing.

It also allows for the decomposition of streams without having to have additional processing in dedupe and allows for some specification of 'that which does not dedupe well' and hence allows customers to achieve higher dedupe ratios, and allows customers to not use CPU performing dedupe on data that would not dedupe.

This avoids having to manage the data at the host side to disallow the storage of certain file types that are known to dedupe badly which would limit the usefulness of the backup system. Furthermore, it avoids the application's interspersal that would otherwise hinder dedupe performance and therefore, avoids having to adjust the application defaults at the host side which is undesirable from many users' viewpoints, or to change the host application which, again, would be undesirable to the users.

Any of the features disclosed in this specification, including the accompanying claims, abstract and drawings, and/or any of the steps of any method or process so disclosed, may be combined in any combination, except combinations were the sum of such features and/or steps are mutually exclusive. Each feature disclosed in this specification, including the accompanying claims, abstract and drawings may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of any foregoing embodiment. The claims should be construed to cover merely the foregoing embodiment, but also any embodiments which fall within the scope of the claims which will be readily apparent to the ordinarily skilled person reading the foregoing. The invention extends to any novel one, or any novel combination, of the features disclosed in this specification, including the accompanying claims, abstract and drawings, or to any novel one, or any novel combination, of the steps of any method or process so disclosed.

The embodiment within the scope of the present invention also includes at least one computer readable medium for having above described computer executable program instructions or data structures stored thereon, also known as computer software. Such computer readable medium can be any suitable medium accessible by a general purpose or special purpose computer system or data storage system. Computer executable instructions may comprise, for example, instructions and data which cause a general purpose computer, special purpose computer, or other special purpose processing device to perform a certain function or group of functions. The software of the present invention can be implemented in several different ways. The implementation of software is not limiting on the invention.

The invention claimed is:

1. A method of selectively deduplicating an incoming data stream having plural segments, the method comprising:
    as the incoming data stream is received by a server having a processor from a data source over a network and prior to storing the incoming data stream into a first store, determining, by the server, which of the plural segments that are associated with corresponding types is of a predetermined type;
    selecting, by the server, segments according to the predetermined type from the plural segments, wherein selecting the segments for deduplication is based on at least one predetermined condition being met, the predetermined condition relating to a time associated with the plural segments;
    using a deduplication engine in the server to deduplicate the selected segments according to the predetermined type;
    storing, by the server, the deduplicated data segments in the first store;
    deciding, by the server, to not deduplicate segments of the incoming data stream that are according to another one of the types, wherein the selective deduplication of the selected segments and the decision not to deduplicate the segments of the another type are performed at the server without management of the incoming data stream at the data source to control deduplicated storage of the incoming data stream.

2. The method of claim 1, further comprising providing a second store to store the segments of the another type.

3. The method of claim 2, further comprising identifying a type of a source of a second incoming data stream and storing the second incoming data stream in the second store, wherein the second incoming data stream is not selected for deduplication.

4. The method of claim 1, wherein each of at least some of the plural segments comprises a plurality of chunks of data.

5. The method of claim 2, wherein the determining and selecting are performed by a manager in the server prior to the incoming data stream being provided to the first store.

6. A method, executed in an apparatus having a processor, for selectively deduplicating data, the method comprising:
    uploading a plurality of rule definitions, including a definition of a plurality of predetermined types of data suitable for deduplication, into an interface;
    applying, by the apparatus, the plurality of rule definitions to an incoming data stream in the interface;
    identifying a first portion of the incoming data stream determined to be one of the predetermined types suitable for deduplication, and passing, in response to determining that a predefined condition relating to a time associated with the incoming data stream has been met, the identified first portion to a deduplication engine in the apparatus to apply deduplication on the identified first portion; and
    identifying a second portion of the incoming data stream determined to not be any one of the predetermined types suitable for deduplication, and bypassing the deduplication engine for the identified second portion to avoid performing deduplication on the identified second portion, wherein the incoming data stream is received by the apparatus from a data source over a network, and wherein selective deduplication and non-deduplication of the identified first and second portions are performed at the apparatus without management of the incoming data stream at the data source to control deduplicated storage of the incoming data stream.

7. A server for selectively deduplicating an incoming data stream having plural segments, the server comprising:
    a first store;
    a processor to:
        as the incoming data stream is received from a data source over a network and prior to storing the incoming data stream into the first store, determine which of the plural segments that are associated with corresponding types is of a predetermined type; and
        select segments according to the predetermined type from the plural segments, wherein the selecting is based on a predetermined condition relating to a time associated with the plural segments being met; and a deduplication engine to deduplicate the selected segments according to the predetermined type, and store the deduplicated segments into the first store, wherein the processor is to decide to not deduplicate segments of the incoming data stream that are according to another one of the types, and wherein the selective deduplication of the selected segments and the decision not to deduplicate the segments of the another type are performed at the server without management of the incoming data stream at the data source to control deduplicated storage of the incoming data stream.

8. The server of claim 7, further comprising a virtual tape library (VTL) interface configured to receive incoming data streams from the data source that includes a host computer system, wherein the VTL interface includes the processor and is configured to perform the determining and the selecting.

9. The server according to claim 8, further comprising a second store for storing the segments of the another type not subject to deduplication.

10. Apparatus for selectively deduplicating data, comprising:

an interface to receive a rule definition specifying a plurality of predetermined types of data suitable for deduplication, to receive an incoming data stream, and to apply the rule definition to the incoming data stream; and a deduplication engine to deduplicate data, wherein the interface is to further:

identify a first portion of the incoming data stream determined to be one of the predetermined types suitable for deduplication, and pass, in response to determining that a predefined condition relating to a time associated with the incoming data stream has been met, the identified first portion to the deduplication engine to apply deduplication on the identified first portion; and identify a second portion of the incoming data stream determined to not be any one of the predetermined types suitable for deduplication, and bypass the deduplication engine for the identified second portion to avoid performing deduplication on the identified second portion, wherein the incoming data stream is received by the apparatus from a data source over a network, and wherein selective deduplication and non-deduplication of the identified first and second portions are performed at the apparatus without management of the incoming data stream at the data source to control deduplicated storage of the incoming data stream.

11. A non-transitory computer readable medium having stored thereon computer program instructions that, when executed by a computer system, cause the computer system to:

segment an incoming data stream received from a data source over a network into plural segments;

determine a type of each segment of the incoming data stream, wherein the segments of the incoming data stream are according to plural types;

select segments that are according to a predetermined one of the types if at least one predetermined condition is met, the predetermined condition relating to a time associated with the plural segments;

deduplicate the selected segments; and decide to not deduplicate segments of the incoming data stream that are according to another one of the types, wherein the selective deduplication of the selected segments and the decision not to deduplicate the segments of the another type are performed at the computer system without management of the incoming data stream at the data source to control deduplicated storage of the incoming data stream.

12. A non-transitory computer readable medium having stored thereon computer program instructions that, when executed by a computer system, cause the computer system to:

upload a rule definition specifying a plurality of predetermined types of data suitable for deduplication, into an interface;

apply the rule definition to an incoming data stream in the interface;

identify a first portion of the incoming data stream determined to be one of the predetermined types suitable for deduplication, and pass, in response to determining that a predefined condition relating to a time associated with the incoming data stream has been met, the identified first portion to a deduplication engine to apply deduplication on the identified first portion; and identify a second portion of the incoming data stream determined to not be any one of the predetermined types suitable for deduplication, and bypass the deduplication engine for the identified second portion to avoid performing deduplication on the identified second portion, wherein the incoming data stream is received by the computer system from a data source over a network, and wherein selective deduplication and non-deduplication of the identified first and second portions are performed at the computer system without management of the incoming data stream at the data source to control deduplicated storage of the incoming data stream.

* * * * *

UNITED STATES PATENT AND TRADEMARK OFFICE
CERTIFICATE OF CORRECTION

| | |
|---|---|
| PATENT NO. | : 8,660,994 B2 |
| APPLICATION NO. | : 12/695285 |
| DATED | : February 25, 2014 |
| INVENTOR(S) | : Slater et al. |

It is certified that error appears in the above-identified patent and that said Letters Patent is hereby corrected as shown below:

In the Claim

Column 6, line 27, in Claim 5, delete "claim 2," and insert -- claim 1, --, therefor.

Signed and Sealed this
Seventeenth Day of June, 2014

Michelle K. Lee
*Deputy Director of the United States Patent and Trademark Office*